US010785144B2

(12) United States Patent
Micallef

(10) Patent No.: US 10,785,144 B2
(45) Date of Patent: Sep. 22, 2020

(54) LATENCY EQUALIZATION

(71) Applicant: Equinix, Inc., Redwood City, CA (US)

(72) Inventor: Tony Francis Micallef, Warwick, NY (US)

(73) Assignee: Equinix, Inc., Redwood City, CA (US)

( * ) Notice: Subject to any disclaimer, the term of this patent is extended or adjusted under 35 U.S.C. 154(b) by 129 days.

(21) Appl. No.: 15/729,288

(22) Filed: Oct. 10, 2017

(65) Prior Publication Data

US 2018/0191601 A1 Jul. 5, 2018

Related U.S. Application Data

(60) Provisional application No. 62/441,118, filed on Dec. 30, 2016.

(51) Int. Cl.
*G06F 15/16* (2006.01)
*H04L 12/727* (2013.01)
*H04L 12/823* (2013.01)
*H04L 12/841* (2013.01)
*H04L 12/70* (2013.01)
*H04L 12/26* (2006.01)

(52) U.S. Cl.
CPC ........ *H04L 45/121* (2013.01); *H04L 43/0858* (2013.01); *H04L 47/00* (2013.01); *H04L 47/28* (2013.01); *H04L 47/283* (2013.01); *H04L 47/32* (2013.01)

(58) Field of Classification Search
CPC ................................. H04L 7/00; H04L 47/00
USPC ................................................. 709/231, 232
See application file for complete search history.

(56) References Cited

U.S. PATENT DOCUMENTS

| 5,820,463 | A | 10/1998 | O'Callaghan | |
|---|---|---|---|---|
| 7,239,609 | B2 * | 7/2007 | Yokota | H04L 29/06 370/230 |
| 8,094,764 | B2 * | 1/2012 | Lackey | H03D 1/04 358/409 |
| 9,172,624 | B1 * | 10/2015 | Naik | H04L 43/0811 |
| 9,450,846 | B1 * | 9/2016 | Huang | H04L 43/0858 |
| 9,762,610 | B1 * | 9/2017 | Kwan | H04L 63/1458 |
| 2005/0044213 | A1 * | 2/2005 | Kobayashi | H04L 43/10 709/224 |
| 2008/0175159 | A1 * | 7/2008 | Caveney | H04L 43/0811 370/248 |
| 2009/0259445 | A1 * | 10/2009 | Bedrosian | H04L 43/50 703/2 |

(Continued)

FOREIGN PATENT DOCUMENTS

EP 2301635 A1 3/2011

OTHER PUBLICATIONS

"Operation, Administration and Maintenance (OAM) Functions and Mechanisms for Ethernet-based Networks," ITU-T Rec. G.8013/Y. 1731, International Telecommunications Union, Aug. 2015, 102 pp.

(Continued)

*Primary Examiner* — Karen C Tang
(74) *Attorney, Agent, or Firm* — Shumaker & Sieffert, P.A.

(57) ABSTRACT

Techniques for enforcing a common signaling latency between components positioned throughout a data center in order to realize latency equalization even though interconnects between components positioned throughout the data center do not by comparison necessarily exhibit a same total physical length.

20 Claims, 8 Drawing Sheets

(56) References Cited

U.S. PATENT DOCUMENTS

| | | | | |
|---|---|---|---|---|
| 2010/0195517 A1* | 8/2010 | Kihara | | H04L 43/0852 |
| | | | | 370/252 |
| 2012/0011191 A2* | 1/2012 | Kaspar | | H04W 76/15 |
| | | | | 709/203 |
| 2012/0036490 A1* | 2/2012 | Onodera | | G06F 17/5031 |
| | | | | 716/113 |
| 2012/0075999 A1* | 3/2012 | Ko | | H04L 43/0858 |
| | | | | 370/238 |
| 2013/0279616 A1* | 10/2013 | Lackey | | H04B 7/0671 |
| | | | | 375/267 |
| 2014/0129731 A1* | 5/2014 | Copsey | | H04L 43/0858 |
| | | | | 709/233 |
| 2014/0323036 A1* | 10/2014 | Daley | | H04H 20/08 |
| | | | | 455/3.06 |
| 2015/0149625 A1* | 5/2015 | Piro, Jr. | | H04L 12/1403 |
| | | | | 709/224 |
| 2015/0319060 A1* | 11/2015 | Lida | | H04L 12/6418 |
| | | | | 709/219 |
| 2017/0104629 A1* | 4/2017 | Cobb | | H04L 41/083 |
| 2017/0214610 A1* | 7/2017 | Nakagawa | | H04L 12/4641 |
| 2017/0324671 A1* | 11/2017 | Zhang | | H04L 45/121 |
| 2018/0295050 A1* | 10/2018 | Lee | | G06F 3/165 |
| 2018/0295144 A1* | 10/2018 | Jackson | | H04L 63/1425 |
| 2018/0324100 A1* | 11/2018 | Retnamony | | H04B 7/18582 |
| 2019/0052565 A1* | 2/2019 | Modi | | H04L 47/11 |

OTHER PUBLICATIONS

International Search Report and Written Opinion of International Application No. PCT/US2017/066508, dated Mar. 14, 2018, 13 pp.

Response to Rule 161 Communication filed in European Application No. 17826080.8 dated Feb. 11, 2020, 56 pp.

Office Action issued in Australian Application No. 2017387920 dated Mar. 30, 2020, 3 pp.

* cited by examiner

LATENCY EQUALIZATION

This application claims priority to and the benefit of U.S. Provisional Patent Application Ser. No. 62/441,118, filed 30 Dec. 2016 and entitled LATENCY EQUALIZATION, the entire content of which is hereby incorporated by reference.

TECHNICAL FIELD

The present disclosure relates to computer networks and, more specifically, to interconnections among co-located networks within data centers.

BACKGROUND

A network services exchange provider or colocation provider ("provider") may employ a communication facility, such as a data center or warehouse, in which multiple customers of the provider locate network, server, and storage gear, and interconnect with lengths of cable to a variety of telecommunications and other network service provider(s) often with a minimum of cost and complexity.

SUMMARY

In general, techniques are described for enforcing a common signaling latency among components positioned throughout a data center, to realize latency equalization even though interconnects between components positioned throughout the data center do not by comparison necessarily exhibit a same total physical length. Although the present disclosure is not so limited, such techniques may in practice be realized according to one or more of the following example implementations:

A method comprising: by a controller configured to equalize signal path latency in a colocation data center, adjusting signal path latency between a server device and at least one client device to a latency that is equal to, within specification tolerance, signal path latency between the server device and at least one other client device.

A controller comprising: circuitry configured to equalize signal path latency in a colocation data center by adjusting signal path latency between a server device and at least one client device to a latency that is equal to, within specification tolerance, signal path latency between the server device and at least one other client device.

A system comprising: a server device; a plurality of client devices; and a controller configured to adjust signal path latency between the server device and each one of the plurality client devices to a latency that is equal to, within specification tolerance, signal path latency between the server device and a particular one client device of the plurality of client devices.

BRIEF DESCRIPTION OF DRAWINGS

Like reference characters denote like elements throughout the figures and text.

DETAILED DESCRIPTION

The present disclosure relates to techniques for enforcing a common signaling latency between components positioned throughout a data center, to realize latency equalization even though interconnects between components positioned throughout the data center do not by comparison necessarily exhibit a same total physical length. Advantageously, both a storage space and a cost savings may then be realized since only a minimum total physical length or distance of cable may be used for each interconnect. The techniques may also reduce operational costs relating to deploying each interconnect cable. This is in contrast with conventional implementations that in many instances utilize individual spools for each interconnect, where each individual spool is wound with a same physical length or distance of cable in order to satisfy equidistant cabling demands by customers. An appreciation of the various aspects of the present disclosure may be gained from the following discussion in connection with the drawings.

Figure 1:
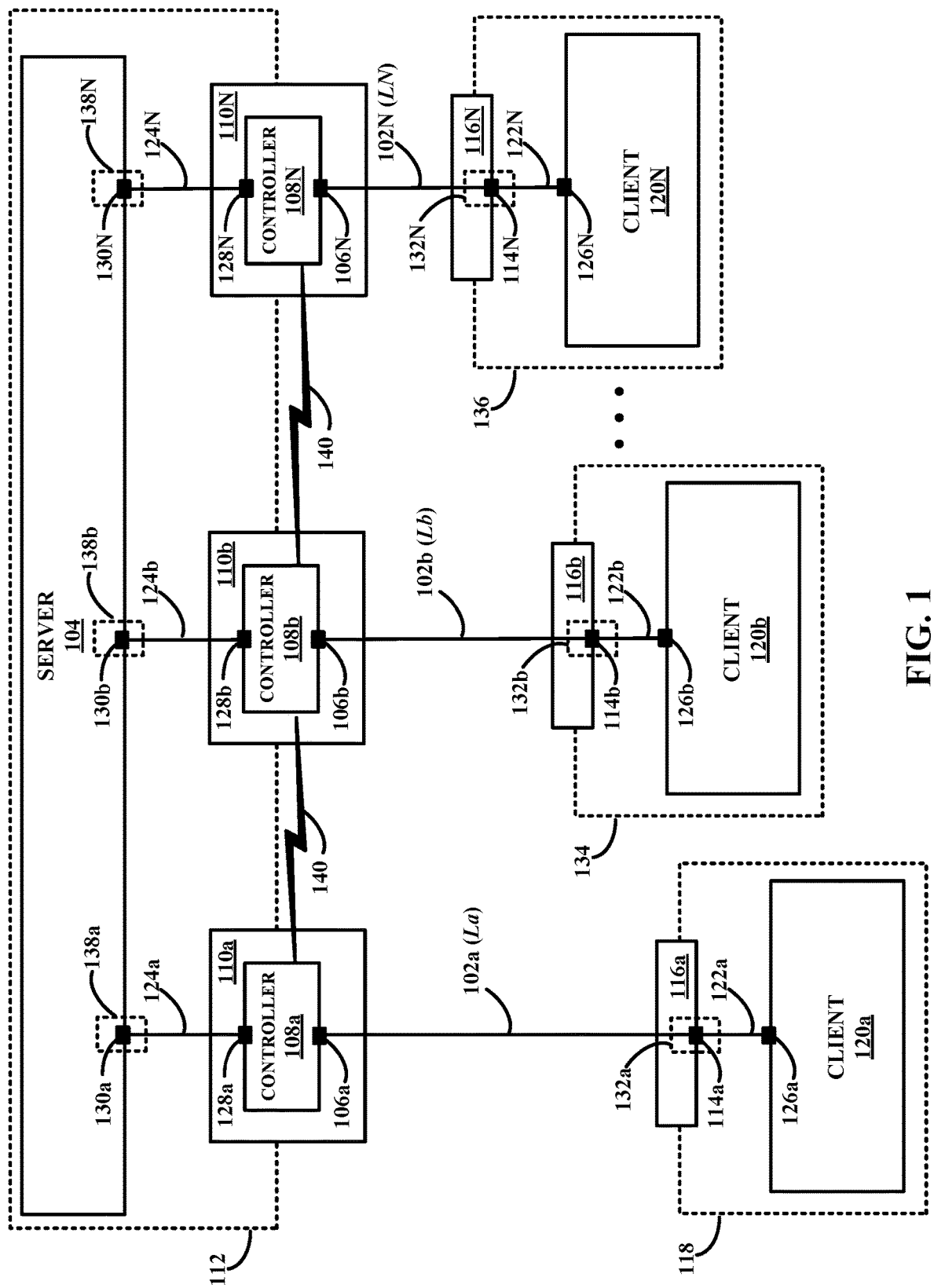
FIG. 1 shows example interconnections in a data center according to the disclosure.

For example, FIG. 1 is a block diagram that illustrates a plurality of cable cross-connects or interconnects 102*a*-N to a server system 104 (equivalently, server 104) in a data center 100. In general, server 104 is a special-purpose computing device(s) that in principle and operation is inextricably linked to computer-related and computer-network-related technical environments, an example of which is discussed below in connection with at least FIG. 5. In some examples, server 104 is configured to execute logical modules of firmware and/or software associated with an equities exchange engine, such as one associated with a stock exchange, commodities exchange, or other financial exchange. Other examples are possible.

In the example of FIG. 1, cable interconnect 102*a* is end-terminated at a hardware port 106*a* of a controller 108*a* that is mounted to a patch panel 110*a*, where patch panel 110*a* in turn is mounted to a security cage 112 that encloses server 104 in data center 100, and is end-terminated at a hardware port 114*a* of a patch panel 116*a* that is mounted to a security cage 118 that encloses a client system 120*a* (equivalently, client 120*a*) in data center 100. In general, client 120*a* is a special-purpose computing device(s) that in principle and operation is inextricably linked to computer-related and computer-network-related technical environments, an example of which is discussed below in connection with at least FIG. 5. In some examples, client 120*a* is configured to execute logical modules of firmware and/or software associated with a retail or institutional investment engine, to engage in e-trading via orders transmitted to server 104. Other examples are possible.

In the example of FIG. 1, a communication link between client 120*a* and server 104 is established via series connection between a cable interconnect 122*a*, cable interconnect 102*a* and a cable interconnect 124*a*, whereby cable interconnect 122*a* is end-terminated at hardware port 114*a* of patch panel 116*a* and at a hardware port 126*a* of client 120*a*, and cable interconnect 124a is end-terminated at a hardware port 128a of controller 108a and at a hardware port 130a of server 104.

In the example of FIG. 1, cable interconnect 102b is end-terminated at a hardware port 106b of a controller 108b that is mounted to a patch panel 110b, where patch panel 110b in turn is mounted to security cage 112 that encloses server 104 in data center 100, and is end-terminated at a hardware port 114b of a patch panel 116b that is mounted to a security cage 134 that encloses a client system 120b (equivalently, client 120b) in data center 100. In general, client 120b is a special-purpose computing device(s) that in principle and operation is inextricably linked to computer-related and computer-network-related technical environments, an example of which is discussed below in connection with at least FIG. 5. In some examples, client 120b is configured to execute logical modules of firmware and/or software associated with a retail or institutional investment engine, to engage in e-trading via orders transmitted to server 104. Other examples are possible.

In the example of FIG. 1, a communication link between client 120b and server 104 is established via series connection between a cable interconnect 122b, cable interconnect 102b and a cable interconnect 124b, whereby cable interconnect 122b is end-terminated at hardware port 114b of patch panel 116b and at a hardware port 126b of client 120b, and cable interconnect 124b is end-terminated at a hardware port 128b of controller 108b and at a hardware port 130b of server 104. In some examples, controller 108b is mounted to patch panel 110a together with controller 108a. In some examples, and without a change in cable connections between any one of clients 120a-b and server 104, controller 108a may be integrated with controller 108b that is mounted to patch panel 110b. Other examples are possible.

In the example of FIG. 1, cable interconnect 102N is end-terminated at a hardware port 106N of a controller 108N that is mounted to a patch panel 110b, where N is an arbitrary integer value, and where patch panel 110N in turn is mounted to security cage 112 that encloses server 104 in data center 100, and is end-terminated at a hardware port 114N of a patch panel 116N that is mounted to a security cage 136 that encloses a client system 120N (equivalently, client 120N) in data center 100. In general, client 120N is a special-purpose computing device(s) that in principle and operation is inextricably linked to computer-related and computer-network-related technical environments, an example of which is discussed below in connection with at least FIG. 5. In some examples, client 120N is configured to execute logical modules of firmware and/or software associated with a retail or institutional investment engine, to engage in e-trading via orders transmitted to server 104. Other examples are possible.

In the example of FIG. 1, a communication link between client 120N and server 104 is established via series connection between a cable interconnect 122N, cable interconnect 102N and a cable interconnect 124N, whereby cable interconnect 122N is end-terminated at hardware port 114N of patch panel 116N and at a hardware port 126N of client 120N, and cable interconnect 124N is end-terminated at a hardware port 128N of controller 108N and at a hardware port 130N of server 104. In some examples, controller 108N is mounted to patch panel 110a together with controller 108a, or is mounted to patch panel 110b together with controller 108b. In some examples, and without a change in cable connections between any one of clients 120a-N and server 104, controller 108a and controller 108b may be integrated with controller 108N that is mounted to patch panel 110N. Other examples are possible.

In practice, each one of cable interconnects 102a-N may represent an optical fiber cable, a coaxial cable, or a twisted pair cable, for example. Although many different implementation-specific architectures and signaling protocols or standards exist, and such architectures and signaling protocols or standards are within the scope of the present disclosure and further may evolve as technology evolves, it is contemplated that server 104 may exchange data using Ethernet communications with each one of clients 120a-N using respective cable interconnects 102a-N, where a latency of the Ethernet communications between server 104 and each one of clients 120a-N, expressed in units of time, correlates to lengths of respective cable interconnects 102a-N. Although, in the example of FIG. 1, it is contemplated that cable interconnects 102a-N do not by comparison necessarily exhibit a same total physical length.

For example, assume that a total physical length La of cable interconnect 102a, defined as the distance along cable interconnect 102a between ends as terminated at hardware port 114a and at hardware port 106a, is 300 meters. Also, assume that a total physical length Lb of cable interconnect 102b, defined as the distance along cable interconnect 102b between ends as terminated at hardware port 114b and at hardware port 106b, is 200 meters. Also, assume that a total physical length LN of cable interconnect 102N, which is defined as the distance along cable interconnect 102N between ends as terminated at hardware port 114N and at hardware port 106N, is 100 meters. Also, assume that each one of cable interconnects 102a-N is realized as a same type of optical fiber, and that a same signaling wavelength is used. As an example, assume that each one of cable interconnects 102a-N is realized as an ITU-T G.652 fiber, with signaling at wavelength 1310 nanometers.

Figure 2:
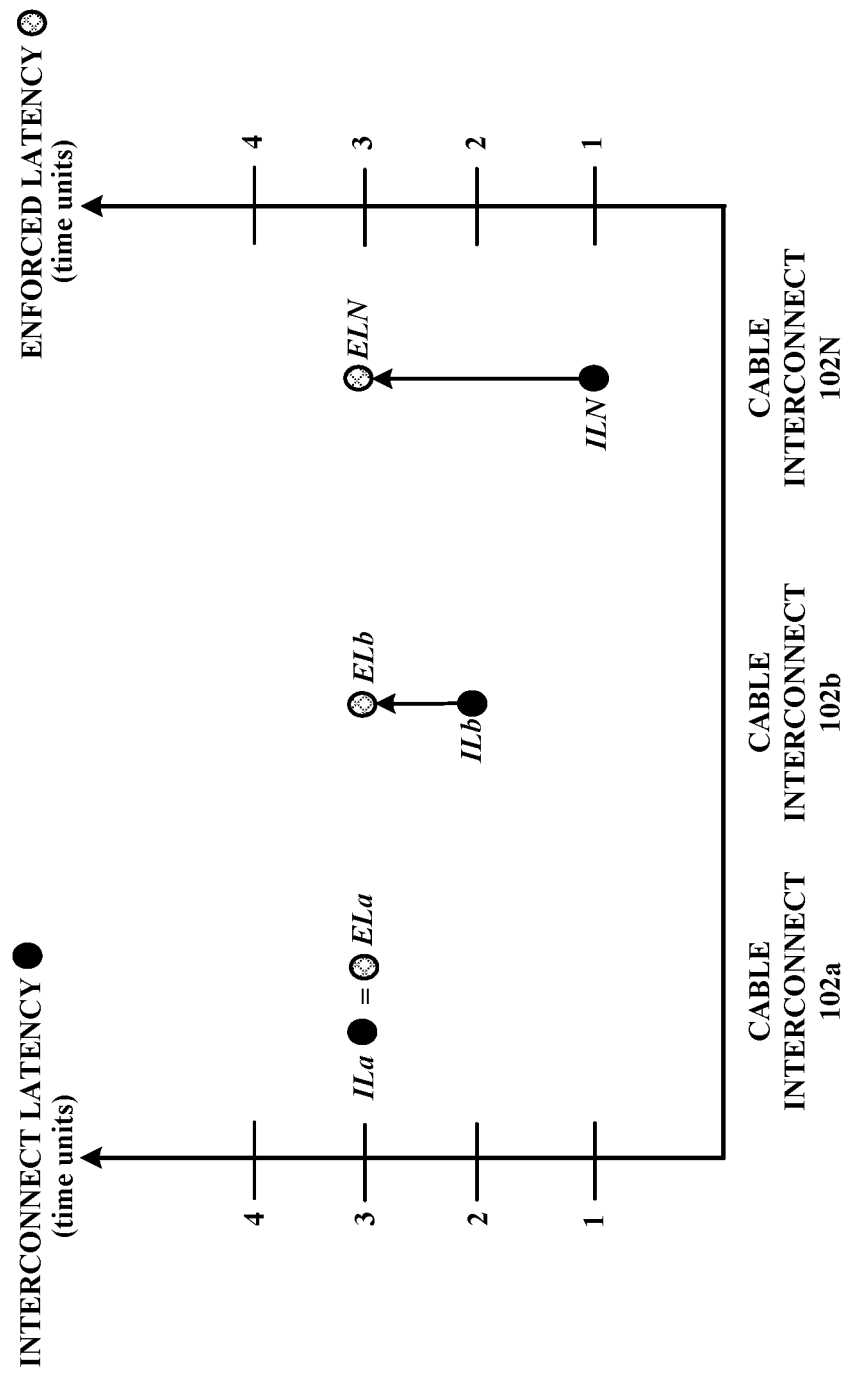
FIG. 2 shows a first example plot according to the disclosure.

In this example, given that optical fiber type and wavelength (and refractive index at the wavelength) are held equal between each one of cable interconnects 102a-N, but that cable interconnects 102a-N do not by comparison exhibit a same total physical length, a latency for each one of cable interconnects 102a-N may in general terms be derived from a length of each one of cable interconnects 102a-N, or the total one-way distance a signal would propagate along each one of cable interconnects 102a-N. Specifically, since in the present example (La=300 meters)>(Lb=200 meters)>(LN=100 meters), and each one of cable interconnects 102a-N is realized as a same fiber and signaling occurs at a same wavelength, a latency ILa for cable interconnect 102a may be determined as 3 time units, a latency ILb for cable interconnect 102b may be determined as 2 time units, and a latency ILN for cable interconnect 102N may be determined as 1 time unit. FIG. 2 is a plot that illustrates these latency parameters for cable interconnects 102a-N in this example, as parameter INTERCONNECT LATENCY in FIG. 2.

With reference to FIG. 2, since (ILa=3 time units)>(ILb=2 time units)>(ILN=1 time unit) in the example, a common or same latency for cable interconnects 102a-N does not exist. Because of this, with all other factors held equal in theory, client 120N holds an advantage over client 120b and client 120a, and client 120b holds an advantage over client 120a, in terms of how much time is required for signaling or communications to and from server 104. It is however contemplated that each one of controllers 108a-N may be configured to enforce a common latency for signaling between clients 120a-N and server 104 by delaying, during the course of e-trading for example, signal transfer between corresponding ones of hardware ports 106a-N and hardware ports 128a-N, based on a determined common latency value to enforce. As an example, an algorithm may including determining a maximum latency value of a corresponding one of cable interconnects 102a-N and then, based on the maximum latency value, determining a delay value for delaying signal transfer between corresponding ones of hardware ports 106a-N and hardware ports 128a-N to enforce a common latency for signaling between clients 120a-N and server 104.

The results of such an algorithm is illustrated in FIG. 2, whereby a common latency value to enforce, parameter ENFORCED LATENCY in FIG. 2, Ela, ELb and ELN, is determined as 3 time units, which corresponds to the maximum latency value of a corresponding one of cable interconnects 102a-N. To physically realize the common latency value to enforce in this example, and with additional reference to FIG. 1, it is contemplated that controller 108a may be configured to pass or relay signals without delay between hardware port 106a and hardware port 128a, that controller 108b may be configured to delay signals between hardware port 106b and hardware port 128b by introducing an artificial delay of 1 time unit, and that controller 108N may be configured to delay signals between hardware port 106N and hardware port 128N by introducing an artificial delay of 2 time units. In this manner, a latency equalization may be achieved even though cable interconnects 102a-N do not by comparison exhibit a same total physical length.

While discussed above in terms of time units, latency of each one of cable interconnects 102a-N may be determined as a time value by a corresponding one of controllers 108a-N. For example, with additional reference to FIG. 1, controller 108a may be configured to determine a latency introduced by cable interconnect 102a by measuring the length of time required for a signal to round-trip propagate between hardware port 106a of controller 108a and a passive reflective element 132a located at hardware port 114a of patch panel 116a. For example, controller 108a may in practice measure the length of time required for a signal to round-trip propagate between hardware port 106a of controller 108a and passive reflective element 132a located at hardware port 114a of patch panel 116a as about 60 microseconds, and halve the 60 microseconds to account for the round-trip to determine that latency of interconnect cable 102a is about 30 microseconds. In FIG. 2, 30 microseconds is depicted as 3 time units.

Similarly, controller 108b may be configured to determine a latency introduced by cable interconnect 102b by measuring the length of time required for a signal to round-trip propagate between hardware port 106b of controller 108b and a passive reflective element 132b located at hardware port 114b of patch panel 116b. For example, controller 108b may in practice measure the length of time required for a signal to round-trip propagate between hardware port 106b of controller 108b and passive reflective element 132b located at hardware port 114b of patch panel 116b as about 40 microseconds, and halve the 40 microseconds to account for the round-trip to determine that latency of interconnect cable 102b is about 20 microseconds. In FIG. 2, 20 microseconds is depicted as 2 time units.

Similarly, controller 108N may be configured to determine a latency introduced by cable interconnect 102N by measuring the length of time required for a signal to round-trip propagate between hardware port 106N of controller 108N and a passive reflective element 132N located at hardware port 114N of patch panel 116N. For example, in practice controller 108N may measure the length of time required for a signal to round-trip propagate between hardware port 106N of controller 108N and passive reflective element 132N located at hardware port 114N of patch panel 116N as about 20 microseconds, and halve the 20 microseconds to account for the round-trip to determine that latency of cable interconnect 102N is about 10 microseconds. In FIG. 2, 10 microseconds is depicted as 1 time unit.

Figure 3:
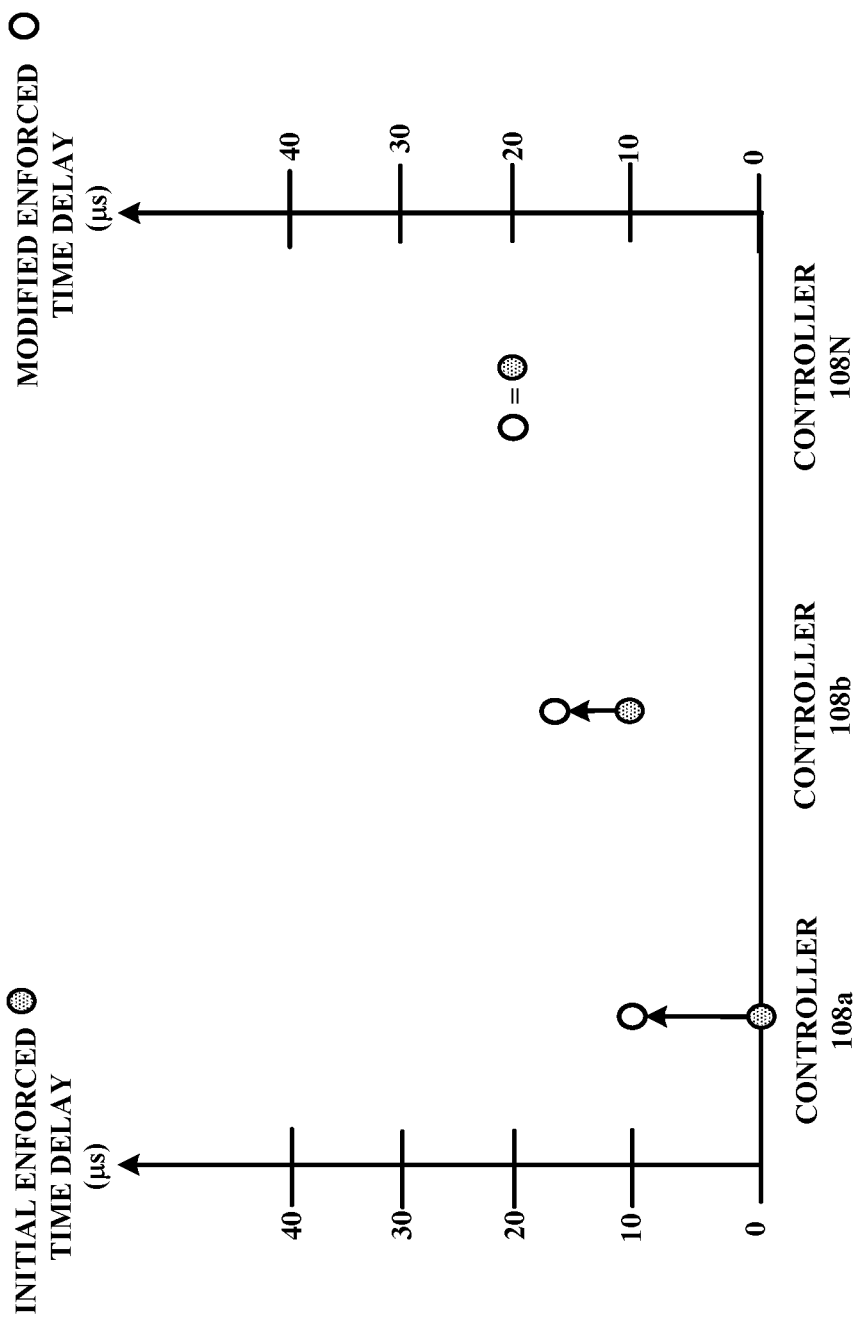
FIG. 3 shows a second example plot according to the disclosure.

To physically realize a common latency value to enforce in this example, it is contemplated that controller 108a may be configured to pass signals without delay between hardware port 106a and hardware port 128a, that controller 108b may be configured to delay signal transfer between hardware port 106b and hardware port 128b by 10 microseconds, and that controller 108N may be configured to delay signal transfer between hardware port 106N and hardware port 128N by 20 microseconds. FIG. 3 is a plot that illustrates time delay enforced by each one of controllers 108a-N in this example, as parameter INITIAL ENFORCED TIME DELAY.

In addition, it is contemplated that a delay or latency introduced by a corresponding one of cable interconnects 124a-N may be factored in to account for other path latencies. For example, with additional reference to FIG. 1, it is contemplated that controller 108a may be configured to determine a latency introduced by cable interconnect 124a by measuring the length of time required for a signal to round-trip propagate between hardware port 128a of controller 108a and a passive reflective element 138a located at hardware port 130a of server 104. For example, controller 108a may in practice measure the length of time required for a signal to round-trip propagate between hardware port 128a of controller 108a and passive reflective element 138a located at hardware port 130a of server 104 as about 20 microseconds, and halve the 20 microseconds to account for the round-trip to determine that latency of cable interconnect 124a is about 10 microseconds.

Similarly, controller 108b may be configured to determine a latency introduced by cable interconnect 124b by measuring the length of time required for a signal to round-trip propagate between hardware port 128b of controller 108b and a passive reflective element 138b located at hardware port 130b of server 104. For example, controller 108b may in practice measure the length of time required for a signal to round-trip propagate between hardware port 128b of controller 108b and passive reflective element 138b located at hardware port 130b of server 104 as about 30 microseconds, and halve the 30 microseconds to account for the round-trip to determine that latency of cable interconnect 124b is about 15 microseconds.

Similarly, controller 108N may be configured to determine a latency introduced by cable interconnect 124N by measuring the length of time required for a signal to round-trip propagate between hardware port 128N of controller 108N and a passive reflective element 138N located at hardware port 130N of server 104. For example, controller 108N may in practice measure the length of time required for a signal to round-trip propagate between hardware port 128N of controller 108N and passive reflective element 138N located at hardware port 130N of server 104 as about 40 microseconds, and halve the 40 microseconds to account for the round-trip to determine that latency of cable interconnect 124N is about 20 microseconds.

To physically factor in delay or latency introduced by a corresponding one of cable interconnects 124a-N in this example, it is contemplated that controller 108a may be configured to introduce a delay in signal transfer between hardware port 106a and hardware port 128a of 10 microseconds, the mathematical difference between the maximum latency time value for or of cable interconnects 124a-N and the latency value for cable interconnect 124a, that controller 108b may be configured to introduce a delay in signal transfer between hardware port 106b and hardware port 128b of 5 microseconds, the mathematical difference between the maximum latency time value for or of cable interconnects 124a-N and the latency value for cable interconnect 124b, and that controller 108N may be configured to introduce a delay in signal transfer between hardware port 106N and hardware port 128N of 0 microseconds, the mathematical difference between the maximum latency time value for or of cable interconnects 124a-N and the latency value for cable interconnect 124N. FIG. 3 illustrates the introduced time delay in this example, as parameter MODIFIED ENFORCED TIME DELAY.

As depicted in FIG. 3 for the present example, signaling from client 120a to server 104 would be delayed by 10 microseconds by controller 108a, signaling from client 120b to server 104 would be delayed by 15 microseconds by controller 108b, and signaling from client 120N to server 104 would be delayed by 20 microseconds by controller 108N, during the course of e-trading for instance. In this manner, each one of controllers 108a-N is configured for enforcing a common signaling latency between clients 120a-N and server 104 in data center 100, to realize latency equalization even though interconnects 102a-N, 124a-N do not by comparison necessarily exhibit a same total physical length.

Figure 4:
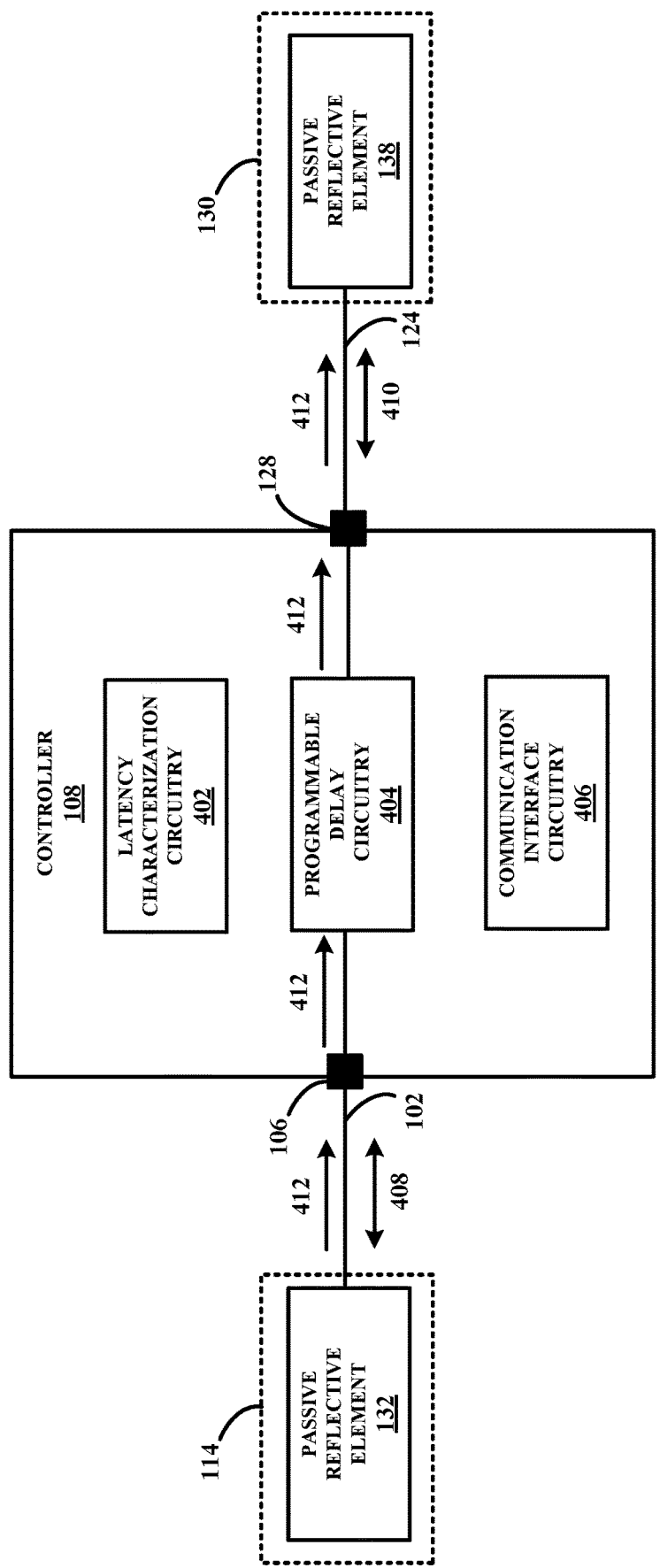
FIG. 4 shows an example controller according to the disclosure.

FIG. 4 is a block diagram that illustrates example circuitry of controllers 108a-N, collectively, controller 108, whereby the following discussion is applicable to each one of controllers 108a-N along with each element positioned in series between each one of clients 120a-N and server 104. In the example of FIG. 4, controller 108 comprises latency characterization circuitry 402, programmable delay circuitry 404, and communication interface circuitry 406. Other implementation-specific examples are possible as discussed in further detail below.

In operation, with additional reference to FIG. 1, controller 108 is configured to activate latency characterization circuitry 402 to generate and transmit a signal 408 via hardware port 106, and to determine a latency introduced by cable interconnect 102 by measuring the length of time required for signal 408 to round-trip propagate between hardware port 106 and passive reflective element 132 located at hardware port 114. Similarly, controller 108 is configured to activate latency characterization circuitry 402 to generate and transmit a signal 410 via hardware port 128, and to determine a latency introduced by cable interconnect 124 by measuring the time required for signal 410 to round-trip propagate between hardware port 128 and passive reflective element 138 located at hardware port 130. An example implementation of programmable delay circuitry 404 is illustrated in each one of FIGS. 8A-C as discussed in further detail below.

Figure 7:
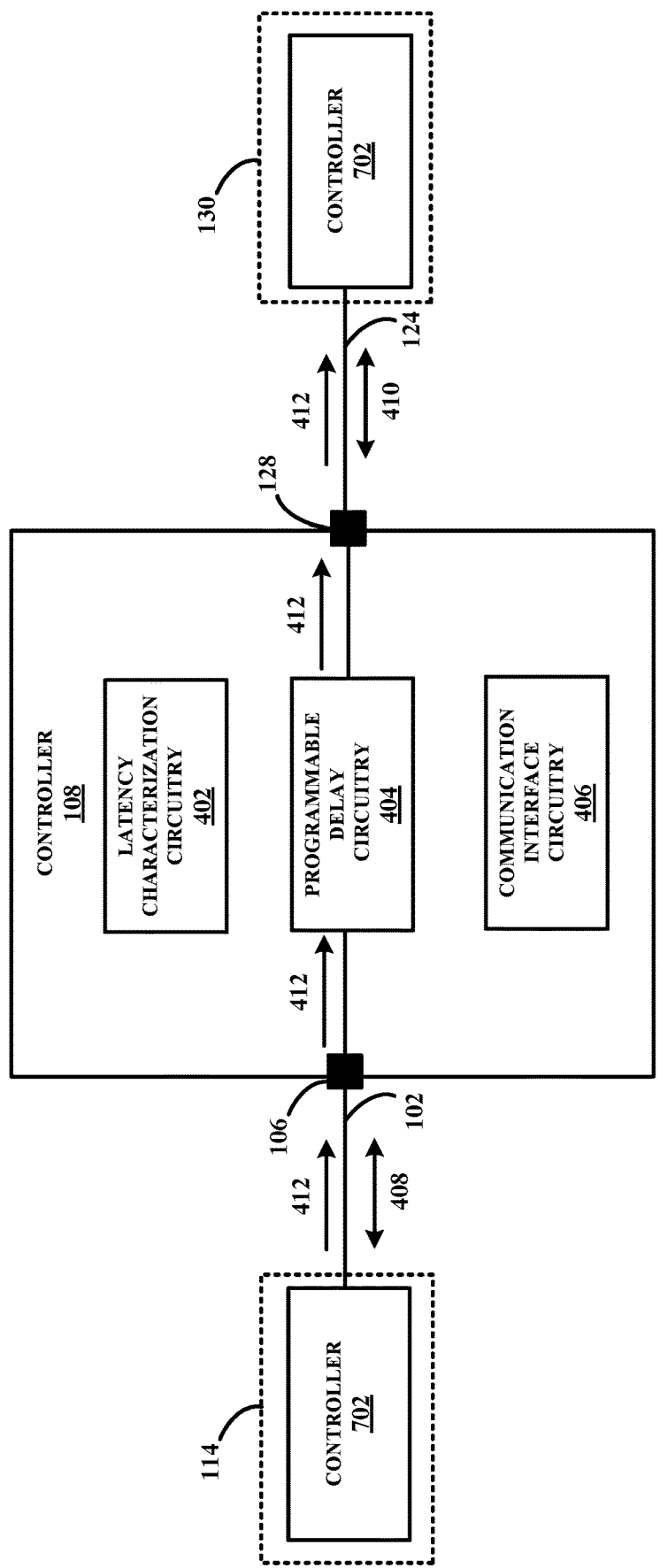
FIG. 7 shows the example controller of FIG. 4 coupled to active port elements.

With reference to FIG. 7, however, in some examples controller 108 may execute active monitoring by exchanging monitoring messages with an active element located at hardware port 114. For example, rather than a passive reflective element 132 as shown in FIG. 4, a controller 702 may be located at hardware port 114 and be configured to receive and inspect signals received via hardware port 114 via cable interconnect 102. Similarly, an instance of controller 702 may be located at hardware port 130. The controller 702 may include an Ethernet switch. The controller 702 may operate as an Ethernet maintenance endpoint (MEP) and exchange Ethernet frames for performance monitoring with controller 108 to determine frame delay for Ethernet frames between controller 108 and controller 702. The frame delays between controller 108 and the controller 702 located at hardware port 114, in each direction, may correlate to the times required for signals to propagate between hardware port 106 and hardware port 114 and therefore be used by controller 108 to determine the maximum latency and compute the enforced delay for each of interconnects 102a-N. In some examples, to determine frame delay, controller 108 and controller 702 located at hardware port 114 may use operation, administration and maintenance frame delay determination techniques described in Recommendation G.8013/Y.1731, "Operation, administration and maintenance (OAM) functions and mechanisms for Ethernet-based networks," International Telecommunication Union-T, August, 2015, which is incorporated by reference herein in its entirety. In some examples, controller 108 and controller 702 located at hardware port 114 may leverage the Optical Supervisory Channel (OSC) for cable interconnect 102 to exchange optical data signals. High-speed circuitry of controller 702 located at hardware port 114 may return an optical data signal, received via cable interconnect 102 using the OSC for cable interconnect 102, to controller 108 via cable interconnect 102 using the OSC for cable interconnect 102, which measures the round-trip latency of the optical data signal. Other techniques for determining latencies for each of interconnects 102a-N are contemplated, such as Internet Protocol PING.

With reference back to FIG. 4, controller 108 is further configured to activate communication interface circuitry 406 to establish a communication link 140 (see FIG. 1) between each one other instance of controller 108 in order to share and obtain latency time values for each one of cable interconnects 102a-N and, in some examples, latency time values for each one of cable interconnects 124a-N. Controller 108 is further configured to activate and program the programmable delay circuitry 404 to delay a signal 412 transmitted from one of clients 120a-N to server 140, during e-trading for example, based on one or both of the latency time values for each one of cable interconnects 102a-N and latency time values for each one of cable interconnects 124a-N, in a manner as discussed above in connection with FIGS. 1-3.

Figure 5:
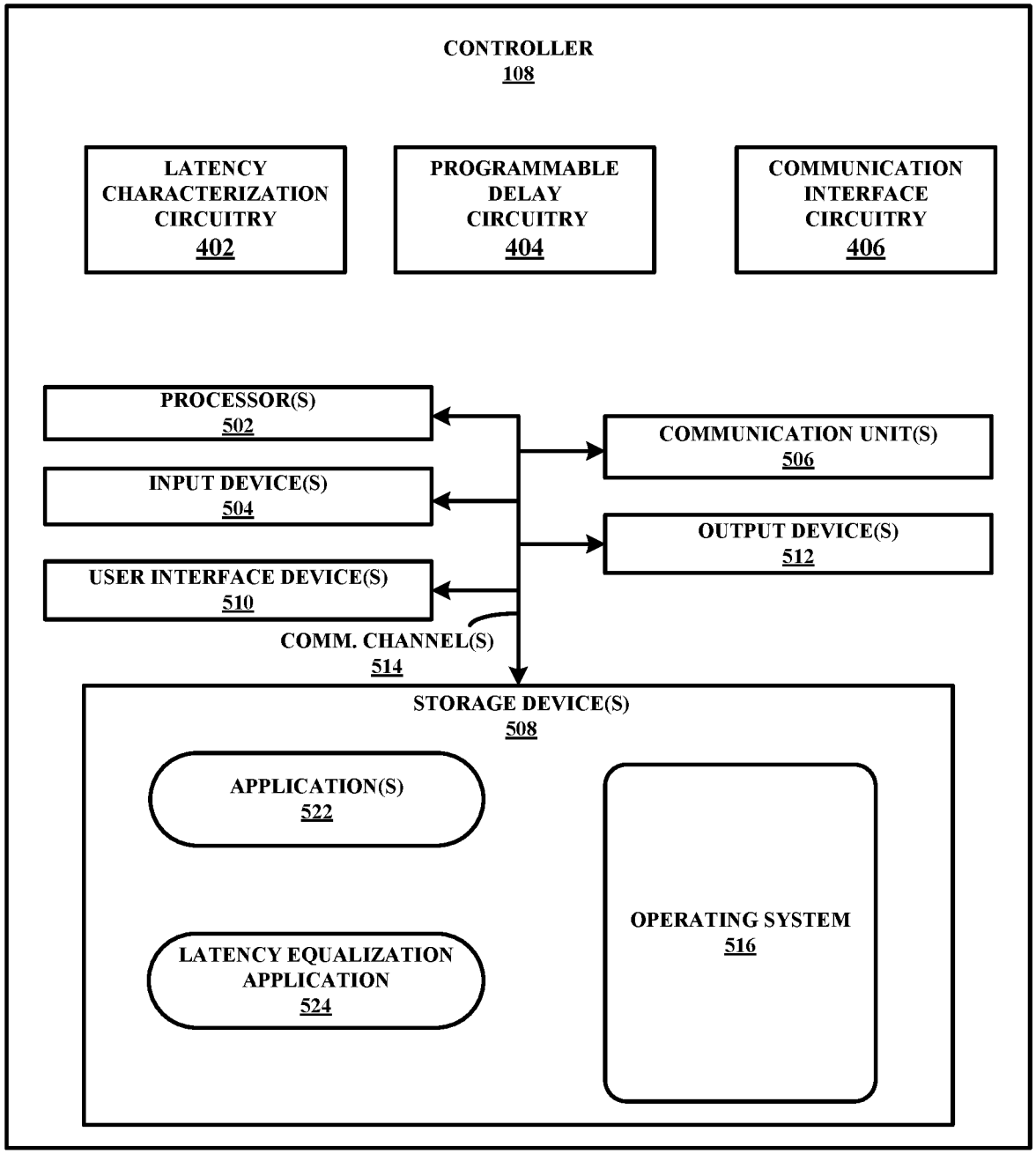
FIG. 5 shows the example controller of FIG. 4 in greater detail.

FIG. 5 is a block diagram that illustrates example circuitry of controllers 108a-N, collectively, controller 108, in greater detail than FIG. 4 whereby the following discussion is applicable to each one of controllers 108a-N, as well as controller 702, along with each element positioned in series between each one of clients 120a-N and server 104, including each one of clients 120a-N and server 104 that in general may be configured and/or arranged in manner similar to controller 108.

Controller 108 is an example of a special-purpose computing device(s), that in principle and operation is inextricably linked to computer-related and computer-network-related technical environments, for enforcing a common signaling latency between components positioned throughout data center 100, to realize latency equalization even though interconnects between components positioned throughout data center 100 do not by comparison necessarily exhibit a same total physical length. Thus, controller 108 may include a server or other computing device that includes one or more processor(s) 502 for executing a latency equalization program or application 524. Although shown in FIG. 5 as a stand-alone computing device for purposes of example, a computing device may be any component or system that includes one or more processors or other programmable circuitry for executing software instructions and, for example, need not necessarily include one or more elements shown in FIG. 5 (e.g., communication units 506; and in some examples components such as storage device(s) 508 may not be co-located or in the same chassis as other components).

As shown in the specific example of FIG. 5, controller 108 includes one or more processors 502, one or more input devices 504, one or more communication units 506, one or more output devices 512, one or more storage devices 508, and user interface (UI) device 510, and communication unit 506. Controller 108, in one example, further includes one or more applications 522, latency equalization application 524, and operating system 516 that are executable by controller 108. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. Communication may be via one or more communication protocols including ModBus, BacNET, proprietary DDC or PLC manufacturer's protocol, or an open protocol. As one example, components 502, 504, 506, 508, 510, and 512 may be coupled by one or more communication channels 514. Controller 108 may be located and execute, for example, within data center 100 or at another location.

Processors 502, in one example, are configured to implement functionality and/or process instructions for execution within controller 108. For example, processors 502 may be configured for processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within controller 108 during operation. Storage device 508, in some examples, is described as a non-transitory computer-readable storage medium. In some examples, storage device 508 is a temporary memory, meaning that a primary purpose of storage device 508 is not long-term storage. Storage device 508, in some examples, includes volatile memory, meaning that storage device 508 does not maintain stored contents when the computer is turned off. Examples of volatile memories include random access memories (RAM), dynamic random access memories (DRAM), static random access memories (SRAM), and other forms of volatile memories as would be understood by one of skill in the art. In some examples, storage device 508 is used to store program instructions for execution by processors 502. Storage device 508, in one example, is used by software or applications running on controller 108 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Controller 108, in some examples, also includes one or more communication units 506. Controller 108, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include LTE, 3G and WiFi radios. In some examples, controller 108 uses communication unit 506 to communicate with an external device.

Controller 108, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 512 may also be included in controller 108. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Controller 108 may include operating system 516. Operating system 516, in some examples, controls the operation of components of controller 108. For example, operating system 516, in one example, facilitates the communication of one or more applications 522 and latency equalization application 524 with processors 502, communication unit 506, storage device 508, input device 504, user interface devices 510, and output device 512.

Application 522 and latency equalization application 524 may also include program instructions and/or data that are executable by controller 108. Latency equalization application 524 may include instructions for causing controller 108 to perform one or more of the operations and actions described in the present disclosure with respect to controller unit 108, server 104 and client 120. As one example, latency equalization application 524 may include instructions that cause the processor(s) 502 of controller 108 to control latency characterization circuitry 402, programmable delay circuitry 404 and communication interface circuitry 406 in manner consistent with that as discussed above in connection with FIG. 4.

Figure 6:
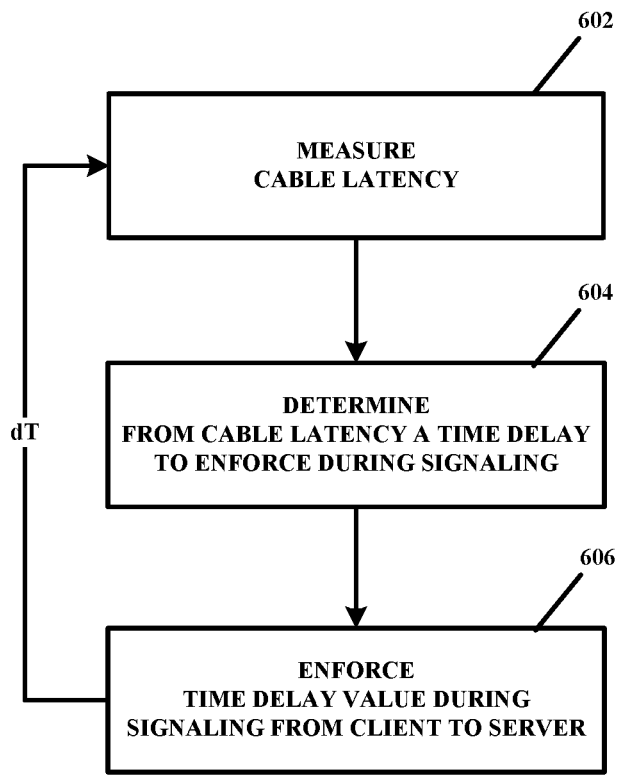
FIG. 6 shows an example method according to the disclosure.

As another example, latency equalization application 524 may include instructions that cause the processor(s) 502 of controller 108 to activate controller 108 to implement a method for enforcing a common signaling latency between components positioned throughout data center 100, to realize latency equalization even though interconnects between components positioned throughout data center 100 do not by comparison necessarily exhibit a same total physical length. An example of such a method is illustrated in FIG. 6 where controller 108 may, periodically or at least intermittently, measure (602) latency values for cable interconnects 102 and/or cable interconnects 124 as shown in FIG. 1, determine (604) from the latency values a time delay value to enforce during signaling from client 120 to server 104 as shown in FIG. 1, and enforce (606) the time delay value during signaling from client 120 to server 104 as shown in FIG. 1 as shown in FIG. 1. Advantageously, both a storage space and a cost savings may be realized by implementation of such techniques, since only a minimum total physical length or distance of cable may be used for each mentioned interconnect. The techniques may also reduce operational costs relating to deploying each interconnect cable. This is in contrast with conventional implementations that in many instances utilize individual spools for each interconnect, where each individual spool is wound with a same physical length or distance of cable in order to satisfy equidistant cabling demands by customers.

The present disclosure relates to techniques for enforcing a common signaling latency between components positioned throughout a data center, to realize latency equalization even though interconnects between components positioned throughout the data center do not by comparison necessarily exhibit a same total physical length. In general, such techniques may be implemented or realized as any one of a method, a controller alone or in a system, and non-transitory computer-readable storage medium.

As an example, a method may include or comprise, by a controller configured to equalize signal path latency in a colocation data center, adjusting signal path latency between a server device and at least one client device to a latency that is equal to, within specification tolerance, signal path latency between the server device and at least one other client device. As an example, signal path latency between client device 120 and server device 104 may correspond to a latency introduced by cable interconnect 102 as discussed above in connection with FIG. 1. As another example, signal path latency between client device 120 and server device 104 may correspond to a latency introduced by cable interconnect 102 as well as cable interconnect 124 as discussed above in connection with FIG. 1. Additionally, the phrase "within specification tolerance" is intended to indicate that signal path latency between the at least one client device and the server and the at least one other client device and server may not be precisely equal, but potentially unequal on a timescale corresponding to clocking periods of a computing device. As an example, signal path latency between client device 120a and server device 104 when enforced may correspond to a realized latency of 10.01 μs whereas signal path latency between client device 120b and server device 104 when enforced may correspond to a realized latency of 10.02 μs.

Additionally, or alternatively, the method may include or comprise delaying signal transmission from the at least one client device to the server device to adjust signal path latency between the server device and the at least one client device to the latency. An example of such an implementation is discussed above in connection with at least FIG. 4, whereby programmable delay circuitry 404 is configured and/or arranged to introduce delay in signal transmission between hardware port 128 and hardware port 130. Other examples are possible.

Additionally, or alternatively, the method may include or comprise receiving a signal from another different controller that is representative of the latency, and based on the signal, adjusting signal path latency between the server device and the at least one client device to the latency. An example of such an implementation is discussed above in connection with at least FIG. 1, whereby client controller 108a and controller 108b may communication to exchange signal path latency information associated with a corresponding one of interconnect 102a-b for example. Other examples are possible.

Additionally, or alternatively, the method may include or comprise measuring a signal path latency between a hardware port of the controller and a hardware port of the at least one client device; and based on the measuring, adjusting signal path latency between the server device and the at least one client device to the latency. An example of such an implementation is discussed above in connection with at least FIG. 1, whereby controller 108 may be configured to determine a latency introduced by cable interconnect 102 by measuring the length of time required for a signal to round-trip propagate between hardware port 106 of controller 108 and a passive reflective element 132 located at hardware port 114 of patch panel 116. Other examples are possible.

Additionally, or alternatively, the method may include or comprise: measuring a signal path latency between a hardware port of the controller and a hardware port of the server device; and based on the measuring, adjusting signal path latency between the server device and the at least one client device to the latency. An example of such an implementation is discussed above in connection with at least FIG. 1, whereby controller 108 may be configured to determine a latency introduced by cable interconnect 124 by measuring the length of time required for a signal to round-trip propagate between hardware port 128 of controller 108 and a passive reflective element 138 located at hardware port 130 of server 104. Other examples are possible.

Additionally, or alternatively, the method may include or comprise establishing a communication link with at least one other controller exchanging, via the communication link, signal path latency information with the at least one other controller; and based on the exchanging, adjusting signal path latency between the server device and the at least one client device to the latency. An example of such an implementation is discussed above in connection with at least FIG. 1, whereby client controller 108a and controller 108c may communicate to exchange signal path latency information associated with a corresponding one of interconnect 102a,c for example. Other examples are possible.

Additionally, or alternatively, the method may include or comprise adjusting signal path latency between the server device and at least one client device to the latency as part of a periodic programmed process to equalize signal path latency in the colocation data center. An example of such an implementation is discussed above in connection with at least FIG. 6, whereby controller 108 may, periodically or at least intermittently, measure latency values for cable interconnects 102 and/or cable interconnects 124 as shown in FIG. 1, determine from the latency values a time delay value to enforce during signaling from client 120 to server 104 as shown in FIG. 1, and enforce the time delay value during signaling from client 120 to server 104 as shown in FIG. 1 as shown in FIG. 1.

Figure 8A:
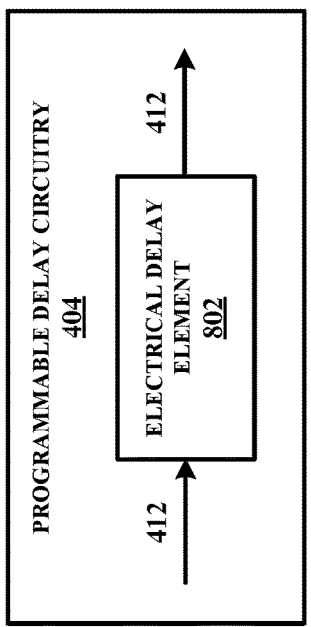
FIGS. 8A-C show example delay circuitry according to the disclosure.
Figure 8B:
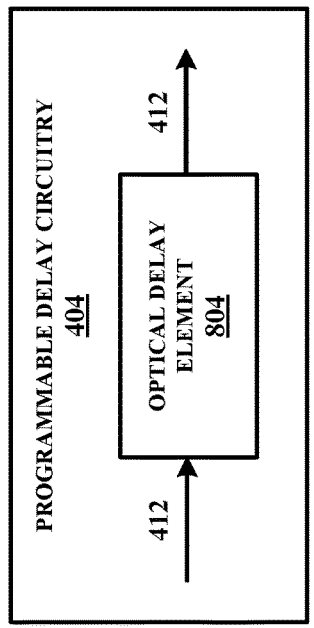
Figure 8C:
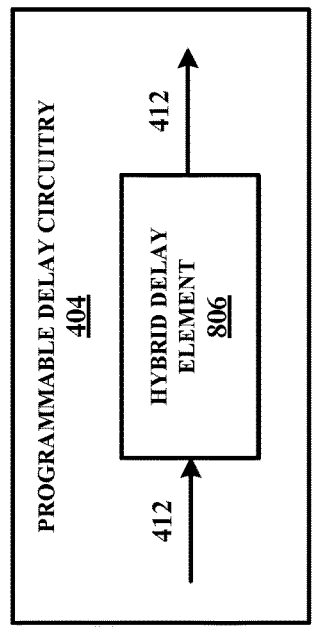

FIGS. 8A-C each show an example implementation of programmable delay circuitry 404 according to the disclosure. As mentioned above in connection with FIG. 4, controller 108 is configured to activate and program the programmable delay circuitry 404 to delay a signal 412 transmitted from one of clients 120a-N to server 140, during e-trading for example, based on one or both of the latency time values for each one of cable interconnects 102a-N and latency time values for each one of cable interconnects 124a-N, in a manner as discussed above in connection with FIGS. 1-3. In one example, an electrical delay element(s) 802 of programmable delay circuitry 404 may include analog and/or digital delay circuitry, and may be utilized to delay signal 142, as shown in FIG. 8A. In this example, various components arranged in any particular topology, such as daisy-chained inverters, flip-flops, buffers (e.g., FIFO) etc., together with oscillator and or timer circuitry may be leveraged to delay signal 142 in a manner as contemplated.

In another example, an optical delay element(s) 804 of programmable delay circuitry 404 may be utilized to delay signal 142, as shown in FIG. 8B. In this example, various components arranged in any particular topology, such as fiber delay lines of varied lengths may be leveraged to delay signal 142 in a manner as contemplated. In another example, an hybrid delay element(s) 806 of programmable delay circuitry 404 may be utilized to delay signal 142, as shown in FIG. 8C. In this example, various elements or components of an electrical delay element(s) 802 of FIG. 8A and optical delay element(s) 804 of FIG. 8B may when arranged in a particular topology together be leveraged to delay signal 142 in a manner as contemplated.

As discussed throughout, many different implementation-specific architectures and signaling protocols or standards exist, and such architectures and signaling protocols or standards are within the scope of the present disclosure and further may evolve as technology evolves. As such, each one of the components or elements of system 100 of FIG. 1 including, but not limited to, cable interconnect 102, server 104, controller 108 and client 120 may be configured and/or arranged in many different ways and it is contemplated that any type or form of programmable or adjustable signal delay mechanism may be used for the purpose of enforcing a common signaling latency among components positioned throughout a data center. As an example, the type or form of the programmable or adjustable signal delay mechanism may be a function of the type of signaling used in the data center, such as an optical delay element, an electrical delay element, or a hybrid delay element as shown in FIGS. 8A-C and discussed throughout. The present disclosure however is not so limited.

For example, other variables that may impact latency, such as signal wavelength, may be programmatically changed so as to introduce delay and by extension a common signaling latency among components positioned throughout a data center. In this example, the form of a signal itself may be used for the purpose of enforcing a common signaling latency among components positioned throughout a data center, where the delay stems from how long it takes a signal to propagate due to intrinsic wavelength or frequency. As such, the programmable or adjustable signal delay mechanism may not necessarily or only uniquely be determined by or tied to operation of controller 108, but instead may be a variable function of the (variable) wavelength of a signal as the signal is transferred among components of the data center, alone or combination with the other techniques as discussed throughout. Still other examples are possible.

As another example, leveraged signal processing techniques, such as data compression or data encryption, may be programmatically changed so as to introduce delay and by extension a common signaling latency among components positioned throughout a data center. In this example, the form of data as encoded in a signal itself may be used for the purpose of enforcing a common signaling latency among components positioned throughout a data center, where the delay stems from how long it takes a computing device (e.g. server 104) to unpack and process data. As such, the programmable or adjustable signal delay mechanism may not necessarily or only uniquely be determined by or tied to operation of controller 108, or even signal wavelength, but instead may be a variable function of the form of data as encoded in a signal as the signal is transferred among components of the data center, alone or combination with the other techniques as discussed throughout. Still other examples are possible.

For instance, techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:
1. A method comprising:
   by a controller separate from a server device and located between the server device and a first client device, the controller configured to equalize signal path latency in a colocation data center,
   adjusting a signal path latency between the server device and the first client device by a difference between a first signal path latency of a first cable interconnect between the server device and the first client device and a second signal path latency of a second cable interconnect between the server device and a second client device.

2. The method of claim 1, further comprising:
delaying signal transmission of a signal received from the first client device to the server device to adjust the signal path latency between the server device and the first client device.

3. The method of claim 1, further comprising:
receiving a signal from another different controller that is representative of the second signal path latency.

4. The method of claim 1, further comprising:
measuring the first signal path latency between a hardware port of the controller coupled to a first end of the first cable interconnect and a hardware port of the first client device coupled to a second end of the first cable interconnect; and
measuring the second signal path latency between a hardware port of a second controller coupled to a first end of the second cable interconnect and a hardware port of the second client device coupled to a second end of the second cable interconnect.

5. The method of claim 1, further comprising:
measuring a third signal path latency of a third cable interconnect between a hardware port of the controller and a first hardware port of the server device;
measuring a fourth signal path latency of a fourth cable interconnect coupled to a second hardware port of the server device; and
adjusting the signal path latency between the server device and the first client device by a difference between the fourth signal path latency and the third signal path latency.

6. The method of claim 1, further comprising:
measuring the first signal path latency of the first cable interconnect between a first hardware port of the controller and a first hardware port of the server device, and the second signal path latency of the second cable interconnect between a second hardware port of a second controller and a second hardware port of the server device.

7. The method of claim 1, further comprising:
establishing a communication link with at least one other controller;
exchanging, via the communication link, signal path latency information with the at least one other controller; and
determining, based on the signal path latency information, the second signal path latency between the server device and the second client device.

8. The method of claim 1, further comprising:
adjusting the signal path latency between the server device and the first client device as part of a periodic programmed process to equalize signal path latency in the colocation data center.

9. A controller comprising:
circuitry configured to equalize signal path latency in a colocation data center, the circuitry configured to adjust signal path latency between a server device separate from the controller and a first client device by a difference between a first signal path latency of a first cable interconnect between the server device and the first client device and a second signal path latency of a second cable interconnect between the server device and a second client device.

10. The controller of claim 9, wherein the circuitry is further configured to delay signal transmission of a signal received from the first client device to the server device to adjust the signal path latency between the server device and the first client device.

11. The controller of claim 9, wherein the circuitry is further configured to receive, from another different controller, a signal that is representative of the second signal path latency.

12. The controller of claim 9, wherein the circuitry is further configured to determine a first measure of the first signal path latency between a hardware port of the controller coupled to a first end of the first cable interconnect and a hardware port of the first client device coupled to a second end of the first cable interconnect, and determine a second measure of the second signal path latency between a hardware port of a second controller coupled to a first end of the second cable interconnect and a hardware port of the second client device coupled to a second end of the second cable interconnect.

13. The controller of claim 9, wherein the circuitry is further configured to determine a measure of a third signal path latency of a third cable interconnect between a hardware port of the controller and a first hardware port of the server device, determine a measure of a fourth signal path latency of a fourth cable interconnect coupled to a second hardware port of the server device, and adjust signal path latency between the server device and the first client device by a difference between the measure of the third signal path latency and the measure of the fourth signal path latency.

14. The controller of claim 9, wherein the circuitry is further configured to determine a first measure of the first signal path latency of the first cable interconnect between a first hardware port of the controller and a first hardware port of the server device, and a second measure of the second signal path latency of the second cable interconnect between a second hardware port of a second controller and a second hardware port of the server device.

15. The controller of claim 9, wherein the controller further comprises communication interface circuitry, and wherein the circuitry is further configured to control the communication interface circuitry to establish a communication link with at least one other controller, exchange, via the communication link, signal path latency information with the at least one other controller and, based on the signal path latency information, determine the second signal path latency between the server device and the second client device.

16. A system comprising:
a server device;
a first client device;
a plurality of second client devices; and
a controller configured to adjust signal path latency between the server device and each one of the plurality of second client devices to a latency that is equal to a difference between a first signal path latency of a first cable interconnect between the server device and the first client device and a second signal path latency of a second cable interconnect between the server device and a corresponding second client device of the plurality of second client devices.

17. The system of claim 16, wherein the controller is further configured to delay signal transmission of signals received from each one of the plurality of second client devices to the server device by a difference between the first signal path latency and the corresponding second signal path latency to adjust the signal path latency between the server device and each one of the plurality of second client devices.

18. The system of claim 16, wherein the controller is further configured to adjust signal path latency between the server device and each second client device of the plurality of second client devices based on a signal, received by the controller from another different controller, that is representative of the second signal path latency corresponding to the second client device.

19. The system of claim 16, wherein the controller is further configured to determine a measure of the second signal path latency between a hardware port of the controller and a hardware port of the corresponding second client device of the plurality of second client devices, wherein the difference between the first signal path latency corresponding second signal path latency comprises a difference between a measure of the first signal path latency and the corresponding measure of the second signal path latency.

20. The system of claim 16, wherein the controller is further configured to determine a first measure of a third signal path latency of a third cable interconnect between a first hardware port of the controller and a first hardware port of the server device, and a second measure of a fourth signal path latency of a fourth cable interconnect between a second hardware port of a second controller and a second hardware port of the server device and, adjust the signal path latency between the server device and each one of the plurality client devices by a difference between the first measure and the second measure.

* * * * *